United States Patent
Rosenbloom et al.

(10) Patent No.: US 8,481,893 B2
(45) Date of Patent: *Jul. 9, 2013

(54) PORTABLE FOOD HEATER

(75) Inventors: Richard H. Rosenbloom, Rochester, NY (US); Leslie L. Thompson, Honeoye Falls, NY (US); Santina McKean, Scottsville, NY (US); William Flanigan, Geneva, NY (US); Brian Louis Teachout, Danville, NY (US); Ian Alan Paull, Henrietta, NY (US)

(73) Assignee: Ameritherm, Inc., Scottsdale, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/890,072

(22) Filed: Sep. 24, 2010

(65) Prior Publication Data

US 2011/0011850 A1 Jan. 20, 2011

Related U.S. Application Data

(63) Continuation of application No. 11/846,145, filed on Aug. 28, 2007, now Pat. No. 7,804,045.

(60) Provisional application No. 60/840,463, filed on Aug. 28, 2006.

(51) Int. Cl.
*F24C 7/10* (2006.01)
*F27D 11/00* (2006.01)

(52) U.S. Cl.
USPC ........... 219/386; 219/385; 219/387; 219/202; 219/404; 219/407; 219/525

(58) Field of Classification Search
USPC ................. 219/385, 386, 387, 202, 404, 407, 219/525

See application file for complete search history.

(56) References Cited

U.S. PATENT DOCUMENTS

| | | | |
|---|---|---|---|
| 3,619,563 A * | 11/1971 | Hirst | 219/386 |
| 4,171,066 A | 10/1979 | Hirose | |
| 4,335,292 A | 6/1982 | Tanaka et al. | |
| 4,933,525 A | 6/1990 | St. Phillips | |
| 5,548,101 A | 8/1996 | Lee | |
| 5,690,851 A | 11/1997 | Yoshioka et al. | |
| 6,664,520 B2 * | 12/2003 | Clothier | 219/634 |
| 2003/0178416 A1 | 9/2003 | Fujii et al. | |
| 2004/0188429 A1 | 9/2004 | Carlsson et al. | |
| 2007/0170174 A1 | 7/2007 | Segiet et al. | |
| 2007/0170175 A1 | 7/2007 | Avendano et al. | |
| 2007/0170177 A1 | 7/2007 | Avendano et al. | |
| 2007/0170178 A1 | 7/2007 | Segiet et al. | |
| 2007/0170179 A1 | 7/2007 | Segiet et al. | |
| 2007/0170195 A1 | 7/2007 | Segiet et al. | |

FOREIGN PATENT DOCUMENTS

| | | |
|---|---|---|
| JP | 401161694 A | 6/1989 |
| JP | 404267093 A | 9/1992 |
| JP | 405068634 A | 3/1993 |

* cited by examiner

*Primary Examiner* — Shawntina Fuqua
(74) *Attorney, Agent, or Firm* — Rothwell, Figg, Ernst & Manbeck, P.C.

(57) ABSTRACT

In one aspect, the present invention provides a consumer appliance that uses RF energy to heat foods stored in a container that is suitable for RF heating.

6 Claims, 10 Drawing Sheets

PORTABLE FOOD HEATER

The present application is a continuation application of U.S. application Ser. No. 11/846,145, filed Aug. 28, 2007, projected to issue as U.S. Pat. No. 7,804,045, which claims the benefit of U.S. Provisional Patent Application No. 60/840,463, filed on Aug. 28, 2006, which are incorporated herein by this reference.

BACKGROUND

1. Field of the Invention

The present invention relates to systems and methods for heating foods. As used herein, the term "food" is intended to be interpreted broadly to include any consumable in solid, liquid or other form.

2. Discussion of the Background

Consumers have found it desirable to have a small and economical appliance that can quickly and efficiently heat consumer foods (e.g., food packed in water or other liquid, coffee, tea, soups, or other foods). The device should be easy to use, safe and reliable.

SUMMARY

The present invention provides systems and methods for heating food.

In one aspect, the present invention provides a small appliance for heating foods with high water content that are packaged in containers suitable for radio-frequency (RF) induction heating. In some embodiments, the appliance is configured to plug into an automotive power socket (e.g., cigarette lighter socket).

In one embodiment, the appliance includes: a generally cylindrical housing having an opening formed in a top portion of the housing for receiving food; a radio-frequency (RF) heating element housed in the housing and at least partially surrounding the opening; a generally cylindrical base member connected to or integral with a bottom portion of the housing, the base member being configured to fit into a conventional automobile cup holder; an RF power circuit configured to provide RF power to the RF heating element, the RF power circuit being housed in the housing and/or the base member; and a power plug electrically coupled to the RF power circuit, the power plug being configured to mate with an automotive power socket. In some embodiments, the RF heating element is a coil. In some embodiments the appliance further includes a user interface for enabling a user of the portable food heater to select one of a heat option and a warm option. In some embodiments, the base member may include cooling vents and the RF power circuit includes an oscillator; an RF power generator coupled to the oscillator; and a controller configured to control the oscillator.

In another aspect, the invention provides a food heating method. In one embodiment, the method includes: obtaining a portable food heater, wherein the portable food heater comprises: a generally cylindrical housing having an opening formed in a top portion of the housing for receiving food; a radio-frequency (RF) heating element housed in the housing and at least partially surrounding the opening; a generally cylindrical base member connected to or integral with a bottom portion of the housing; an RF power circuit configured to provide RF power to the RF heating element, the RF power circuit being housed in the housing and/or the base member; and a power plug electrically coupled to the RF power circuit; placing the base member of the portable food heater into a cup holder of a car, the car having a power socket configured to receive a power plug; plugging the power plug into the power socket; placing food in the opening; and after plugging in the power plug and after placing the food in the opening, activating the portable food heater such that the RF power circuit provides a sufficient amount of RF power to the RF heating element to cause the food to heat.

The above and other embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF PREFERRED EMBODIMENTS

As used herein, the words "a" and "an" mean "one or more."

Figure 1:
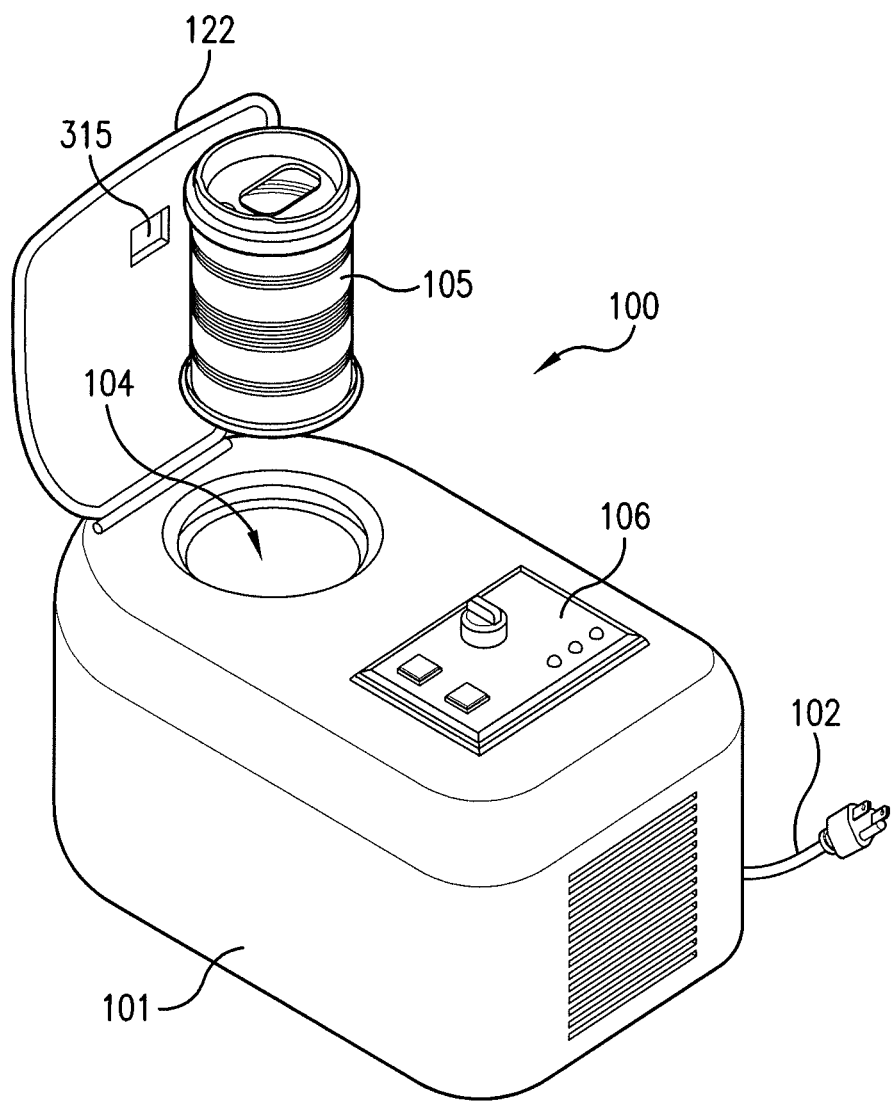
FIG. 1. illustrates an appliance according to one embodiment of the invention.

FIG. 1 illustrates an appliance 100, according to one embodiment of the invention, for heating foods. Appliance 100 includes a housing 101, a plug 102 for plugging into a standard 110VAC outlet, a suitable exposed cavity 104 for receiving a container 105 (e.g., a magnetic steel container) containing food that the user of appliance 100 desires to heat, and a user interface 106, which may include buttons and or knobs or other control devices that enable a user of appliance 100 to operate the appliance.

Appliance 100 may be air cooled and include all safety features for ensuring safe product delivery by suitably controlling product end temperature. Appliance 100 can be a stand alone device or its salient features integrated into a larger appliance such as a cooktop or oven range. In some embodiments, appliance 100 is a countertop appliance that is sized such that is sit fit on most any kitchen countertop. For example, appliance 100 may be the size of a conventional toaster.

Figure 2:
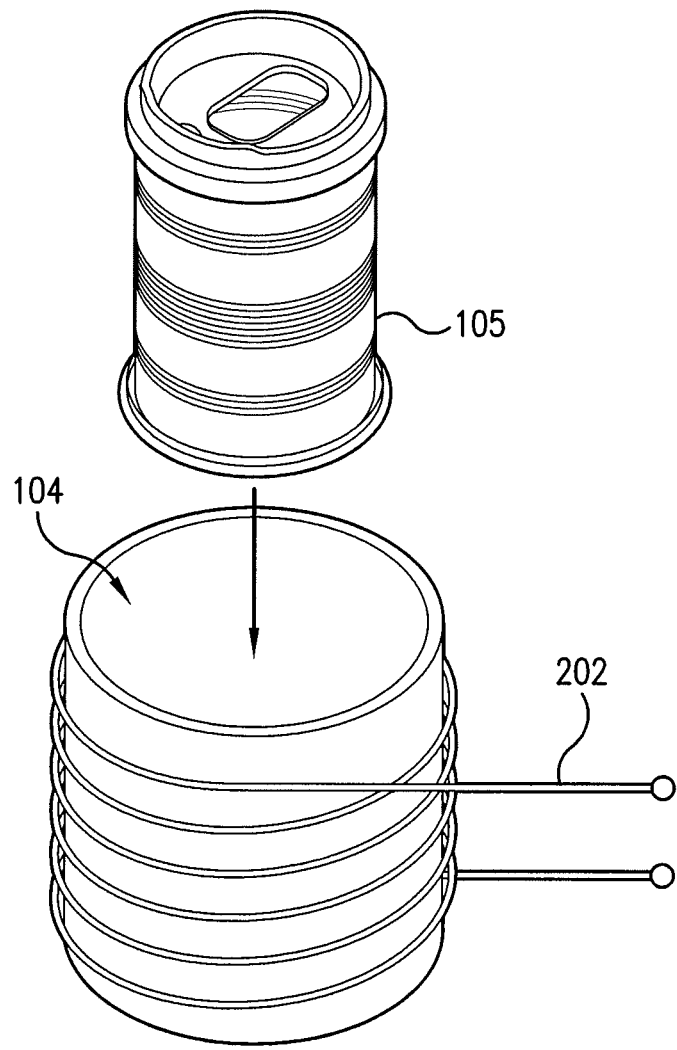
FIG. 2 illustrates a cavity surrounded by an induction heating element.

Cavity 104 is further illustrated in FIG. 2. As illustrated in FIG. 2, in some embodiments, appliance 100 includes a radio-frequency (RF) heating element 202 (e.g., an induction coil 202, such as a copper coil, in the embodiment shown) that is housed within housing 101 and that is configure to be in close proximity to cavity 104. In the embodiment shown, heating element 202 is in the shape of a coil and surrounds or partially surrounds the cavity 104.

Heating element is configured to produce a varying magnetic field when an alternating current passes through element 202. When container 105 is exposed to the varying magnetic field, electrical currents (e.g., eddy currents) are induced in container 105. These induced currents increase the temperature of container 105, and this heat that is produced is used to heat the food in the container. In some embodiments, for user safety reasons, heating element 202 is physically and electrically isolated, thereby preventing direct consumer access.

Figure 3:
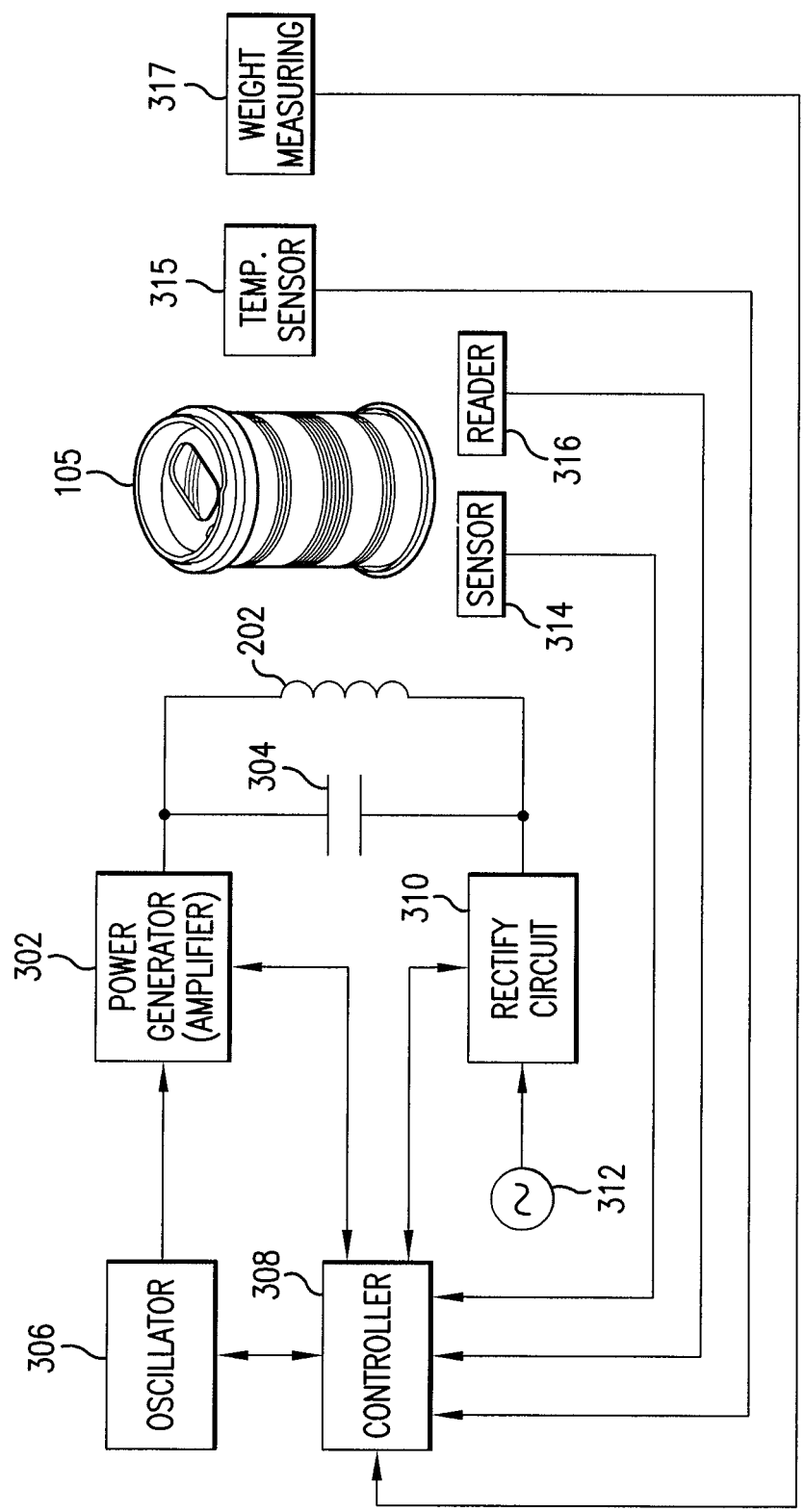
FIG. 3 is a functional diagram of an appliance according to one embodiment of the invention.

Referring now to FIG. 3, FIG. 3 is a functional diagram of appliance 100 according to one embodiment. As illustrated in FIG. 3, element 202 may be coupled to an RF power generator 302 and to a rectifier circuit 310, and may be connected in parallel with a capacitor 304. Rectifier 310 may be connected to an AC power source 312 (e.g., via plug 102) and may be configured to rectify the AC power provided by power source 312. Power generator 302 may be coupled to an oscillator 306 that provides an RF signal to power generator 302, which functions to amplify the RF signal.

Oscillator 306 may be coupled to a control module 308, which may be configured to control the frequency, amplitude and/or duty cycle of the RF signal generated by oscillator 306, and thereby control the RF power delivered to container 105. In some embodiments, to prevent undesirable heating stratification or damage to container 105, controller 308 is configured to ensure that the RF power delivered to container 105 depends on the characteristics of container 105 and/or the food contained therein. In some embodiments, other means of RF generation may be used that do not include an RF oscillator, such as a controlled or dynamically responsive form of a relaxation oscillator.

As also shown in FIG. 3, one or more sensors (e.g., sensors 314-317) may be disposed adjacent or within cavity 102. The sensors may include a "container presence" detector 314 for detecting the presence of a container with cavity 104, a temperature sensor 315 to monitor the temperature of container 105 and/or the food therein, an optical reader 316 (e.g., a bar code reader) for reading indicia (e.g., a bar code or other marking) located on an outer surface of container 105 (e.g., the bottom of container 105), a weight measuring device 317.

As further shown in FIG. 3, appliance 100 may include suitable user controls 340 to allow the user to select or adjust heating profiles (e.g., power level and power delivery duration).

In practice, a user places a compatible (e.g., steel) container 105 of food in the provided cavity 104 and presses a button (e.g., a "Start" button), which causes controller 308 to use heating element 202 to create the RF energy used to heat the container, and, thereby, the food. A Magnetic steel container can be used to improve efficiency with additional effect of hysteretic heating. Controller 308 may be "intelligent" (i.e., controlled by software) and, therefore, can be configured to employ a number of methods to ensure that the food is safely and effectively heated. Some methods to guarantee food-specific heating may employ bar coding, container color coding and/or a user interface.

Container Presence Detection

In some embodiments, appliance 100 senses whether a suitable container 105 has been properly placed in cavity 104 before initiating the desired heat cycle (i.e., before producing the RF energy needed to heat the food). It may be important to detect whether a suitable container 105 has been inserted into cavity 104 before allowing a heating cycle to begin. Failure to do so could allow appliance 100 to be improperly used and create a potential fire/high temperature hazard. A number of methods for detecting the presence of a container 105 are contemplated.

One sensing method could employ circuitry that senses a change in the operation the RF power switching device operation relative to a normal container presence. A sensed change could disable the heating cycle, protecting the user from RF power and the appliance from incorrect operation. Detecting the presence of a container 105 may be accomplished by detecting the difference between a no-load resonant frequency and a loaded resonant frequency. For example, when a container 105 is not present within cavity 104, the resonant frequency of the appliance's tank circuit 399 (see FIG. 3) frequency is lower than when the container 105 is located in cavity 104. Detecting the presence of a container 105 may also be accomplished by detecting the amount of current flowing through coil 202. When a container 105 is not present in cavity 104, less current is drawn than when the container 105 is present in cavity 104. In both cases, the frequency and current draw can be characterized for a container present or not.

Another method (not requiring extra sensors) is to sense the impedance of the RF circuit. In a parallel resonant circuit, the impedance decreases with an increasing effective load in the coil—this is particularly true when the load is well coupled. An excellent example of a well coupled load is a magnetic steel container in close proximity to the RF coil. If the impedance is sensed as being too high (no container or other unintended foreign part), generation of the RF field can be prohibited.

Another sensing method is to use a light source (such as an LED) and a paired sensor. When properly designed, the detected presence, absence or attenuation of a scattered or direct light can be sensed by a receiver and used to determine the presence or absence of a container. The method used can include a source that provides a continuous output on demand or, for more immunity to ambient light, modulated output. When the output is modulated, the sensor can synchronously detect presence or absence of the (light) signal with high accuracy.

A reflective sensor pair, consisting of a source whose beam is reflected off the container to be sensed along with a sensor that is used to detect the reflected output signal, can also be used to determine whether a container is present in the appliance. Reflected sensors are generally provided as matched pairs and even sometimes integrated into a single package. In any case, the sensor must be properly located to sense the reflected light from the emitter source. The emitter can send a continuous signal on demand or be modulated and detected as described in the above transmissive method.

Suitable Container Detection

In addition to detecting the presence or absence of a container within cavity 104, it may be useful to detect whether a present container is suitable or intended for induction heating. For example, an improperly filled container may appear to meet the requirements of container presence, but would be unsuitable because heating such a container could be inappropriate and potentially hazardous. A number of methods for detecting whether a container placed in cavity 104 is suitable and/or intended for induction heating are contemplated.

In some embodiments, the method employs weight measuring device 317 (e.g., a spring/contact, piezoelectric sensor, strain gauge, or other weight measuring device) (which also may be used in determining whether a container is present). In some of these embodiments, controller 108 may be configured to (1) read data provided by sensor 317, which data provides information as to the weight of the object placed in cavity 104 and (2) determine whether the weight of the object falls within a predetermined weight range (e.g., more than 8 ounces). If the object does not fall within the predetermined weight range, then the controller will deem the object to be unsuitable and controller 108 may be programmed to ignore requests from the user to heat the unsuitable object and/or cause an error message to be displayed to the user. Alternatively or in addition to the above, controller 108 may be configured to set the amount of energy delivered to the object based, at least in part, on the data read from device 317.

In some embodiments, the method employs the above mentioned circuitry that senses whether the RF power generator 302 is operating within predetermined operating parameters and/or sensing the impedance of the "load" seen by power generator 302.

In some embodiments, the method employs optical reader 316, which may be exposed to the user or may be internal to appliance 100. In these embodiments, a suitable container may be a container that not only meets a certain weight requirement but also has certain indicia located on an outer surface of the container that can be read by reader 316. For example, in embodiments where the reader 316 is exposed to the user, in order for the user to heat the food in a particular container, the user must first position the container so that reader 316 can read a barcode on the container (thus, if the container does not have a bar code, then, in some embodiments, user can't use appliance 100 to heat the container). After reader 316 reads the barcode, it provides to controller 308 data encoded in the barcode. Controller 308 then determines whether the container may be heated, where the determination is based, at least in part, on the provided data. If controller 308 determines that the container may not be heated, controller 308 may cause an error message to be displayed to the user, otherwise controller 308 may prompt user to place the container in cavity 104.

In embodiments where reader 316 is internal to appliance 100, reader 316 is positioned such that after a user places a container with a barcode in cavity 104, reader 316 can read the barcode, provided the barcode is oriented properly. After reader 316 reads the barcode, it provides to controller 308 data encoded in the barcode. Controller 308 then determines whether the container may be heated, where the determination is based, at least in part, on the provided data. In some embodiments, the bar code may extend all the way around container 105 so that no matter which way container 105 faces, the bar code can be read by the reader.

In some embodiments, if the barcode is not orientated properly relative to reader 316, appliance 100 may automatically move the container so as to properly align the barcode relative to reader 316. For example, appliance 100 may have a rotating device (not shown) for rotating the container around its longitudinal axis. In these embodiments, it may be advantageous to put the barcode (or other indicia) on the bottom of the container and position reader 316 adjacent the bottom of cavity 104 and looking up towards the top of the cavity 104.

In some embodiments, the method for detecting whether the container is suitable and/or intended for induction heating employs a transponder (e.g., an RF identification (RFID) tag or the like) that is attached to the container (e.g., the container may have a built-in RFID tag). For example, the transponder may be attached to the container and covered by a label that is affixed to the container or it may be attached to or within a false bottom of the container. The RF heating element 202 may be used to supply power to the transponder and to communicate with the transponder. In some embodiments, in response to receiving power, the transponder transmits data. The data could include product identification information as well as a heating profile and/or a specified energy to be delivered in heating the container. The controller 308 may use this information to control the heating of the container.

Temperature Detection

While appliance 100 is heating a suitable container 105, it may be beneficial to detect and monitor the temperature of container 105. While temperature sensing may provide the potential for temperature control, it also provides protection against the potential hazard of overheating.

Container overheating could occur if appliance 100 is improperly used to heat an empty, or partially empty, container, re-heat a previously heated container or heat a foreign conductive substance. To provide proper protection or control, the portion of the container with the highest heat transition potential is preferably monitored. The top portion of container 105 appears to be the best candidate.

In order for the heating element 202 to efficiently magnetically couple to container 105, heating element 202 should be in close proximity to container 105. Accordingly, temperature sensor 315 may be embedded in or attached to heating element 202. Also, as discussed above, because it may be advantageous to monitor the top portion of container 105, sensor 315 may be disposed adjacent this portion of container 105.

Usually, it is difficult to obtain a proper temperature reading of container 105 if temperature sensor 315 is in close proximity to heating element 202 when element 202 is being used to generate the RF field used to heat container 105. This is due to the impact that the RF energy has on most sensors. Because one RF heating methods contemplated relies on the high frequency RF field being modulated at twice (2×) the AC frequency, there are recurring instances when no field is present. These instances occur at every half cycle when the AC line voltage swings through 0V. Accordingly, in one embodiment, temperature sensor 315 and/or controller 308 is synchronized with this recurring event to obtain a reading since the field will not exist to interfere with the reading. That is, controller 308 may be programmed to read the output of temperature sensor 308 at the specific instances in time when no RF field is present.

Temperature detection methods can also include direct contact measurement where sensor 315 is placed such that sensor 315 is in direct contact with container 105 at least when container 105 is being heated. One way this can be accomplished is by disposing sensor 315 on a lid 122 that is designed and configured such that, when in a closed position, the lid 122 covers cavity 104 and causes sensor 315 to contact the top portion of container 105 and requiring the user to close lid 122 before heating can being (e.g., the sensor could be attached to the inside of lid 122). Examples of direct contact sensors include semiconductor (temperature sensors or simple $\Delta V_{be}$ of a transistor), thermocouple (dissimilar metal or Siebeck effect) RTD (resistance Temperature device), NTC or PTC (Negative and Positive Temperature Coefficient) devices whose resistance change with temperature.

Additional detection can include a combination approach. Thus, one or more temperature sensors 315 may be employed. Additionally, should a transponder be used for product identification or other purposes (e.g., as described above), the same transponder could include or couple to a temperature sensor and transmit the measured temperature.

Another temperature technique that may be used is to include a liquid crystal temperature monitor on the can. Such devices may change their appearance with a threshold temperature is reached. Such a device could be optically monitored with an inexpensive light source and sensor, as a non-contact technique. This same temperature monitor could then function as a warning indicator to the consumer who would see the monitor and determine based on the color of the monitor whether the product is hot.

Energy Selection

The amount of energy delivered to container 105 by appliance 100 in response to the user initiating the heating of container 105 (e.g., by inserting a suitable container into cavity 104, by pressing a "start" button, etc.) may be set automatically by controller 308 in advance of, or in response to, the user initiating the heating or set manually by the user. A number of methods for automatically selecting the amount of energy are contemplated.

In some embodiments, the automatic selection method employs optical reader 316. In these embodiments, indicia may be located on an outer surface of container 105 so that reader 316 can "read" the indicia (either when the user manually positions the indicia in the field of view of reader 316 or when the user places the container in cavity 104). In response to reading the indicia, reader may output to controller 108 data corresponding to the indicia. Encoded in the indicia may be a product identifier, a power level identifier and/or a heating duration identifier. If only a product identifier is encoded, then controller 308 may use the product identifier and a lookup-table to determine the appropriate power level and duration settings (i.e., for each product identifier included in the table, the table associates a power/duration setting with the identifier).

Alternative Embodiment

Figure 4A:
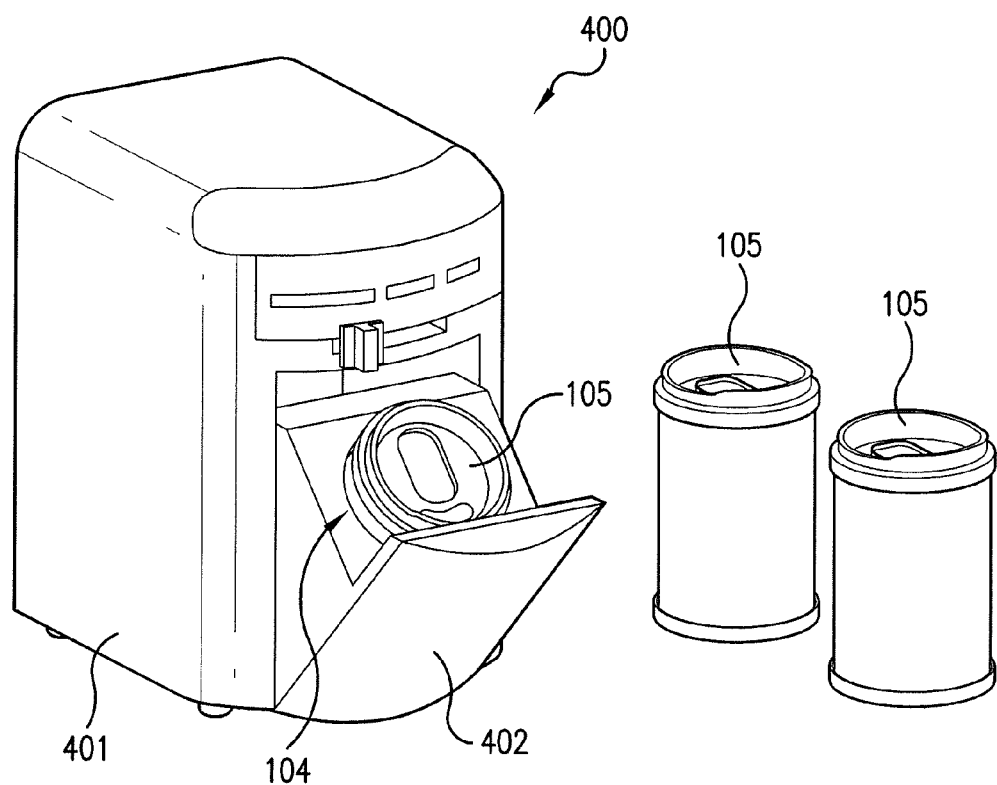
FIGS. 4A-4B illustrate an appliance according to another embodiment of the invention.
Figure 4B:
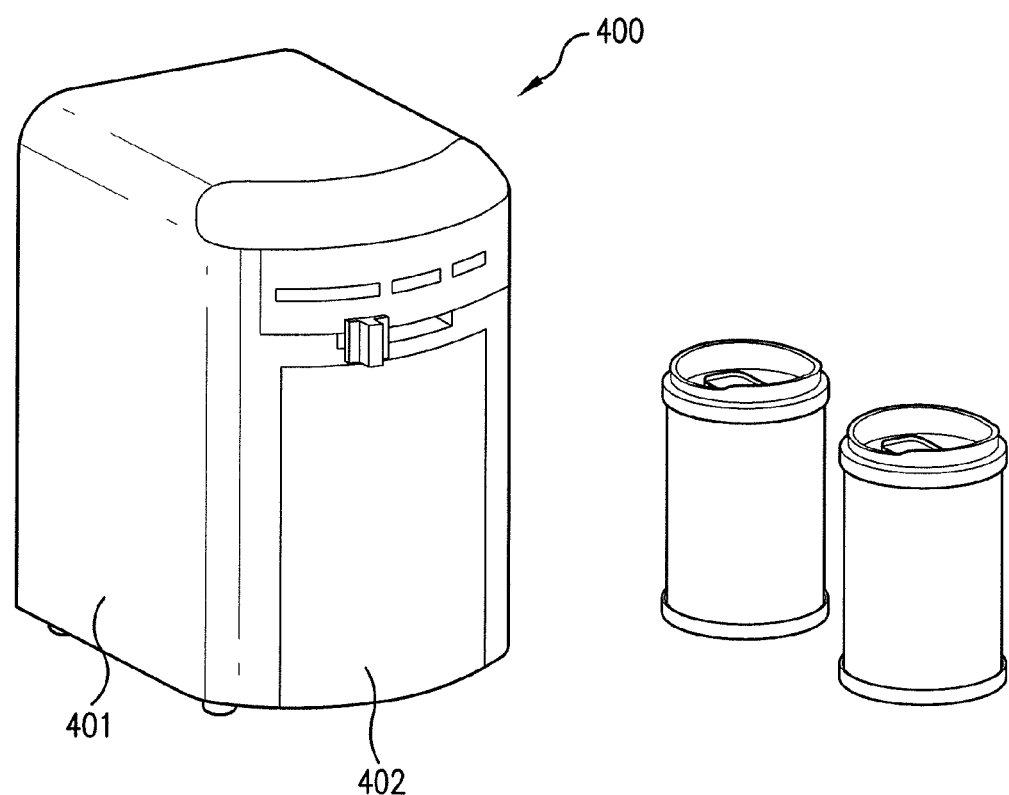

Referring now to FIGS. 4A-B, FIGS. 4A-B illustrate an appliance 400 according to another embodiment of the invention. In some embodiments, appliance 400 is identical to appliance 100 in substantive respect, but with the exception that cavity 104 is contained in a door 402. In the embodiment shown, door 402 moves between an open position (see FIG. 4A) and a closed position (see FIG. 4B). Door 402 may be configured to pivot between its open position and closed position, as is shown in FIGS. 4A,B. But in other embodiments, door 402 may be slideable between its open and closed position so that the door can be slid open and closed like a drawer.

When door 402 is in the open position, cavity 104 is exposed, thereby enabling a user to insert a container into cavity 104. When door 420 is in the closed position, cavity 104 is not exposed, thereby preventing the user from inserting or removing an object from cavity 104.

In embodiments where appliance 400 includes reader 316 and the user is required to position indicia on a container in the field of view of reader 316 in order to heat the food stored in the container, controller 308 may be configured to automatically open door 402 in response to reader 316 reading the indicia and controller 308 confirming that the container is a suitable container based on an output from reader 316.

Also, in embodiments where appliance 400 includes a means for detecting the presence of a container within cavity 104, controller 308 may be configured to automatically close door 402 in response to the detection of a container in cavity 104. In some embodiments, for safety, controller 308 activates power generator 302 only after a suitable container is disposed in cavity and door 402 is closed.

Figure 5:
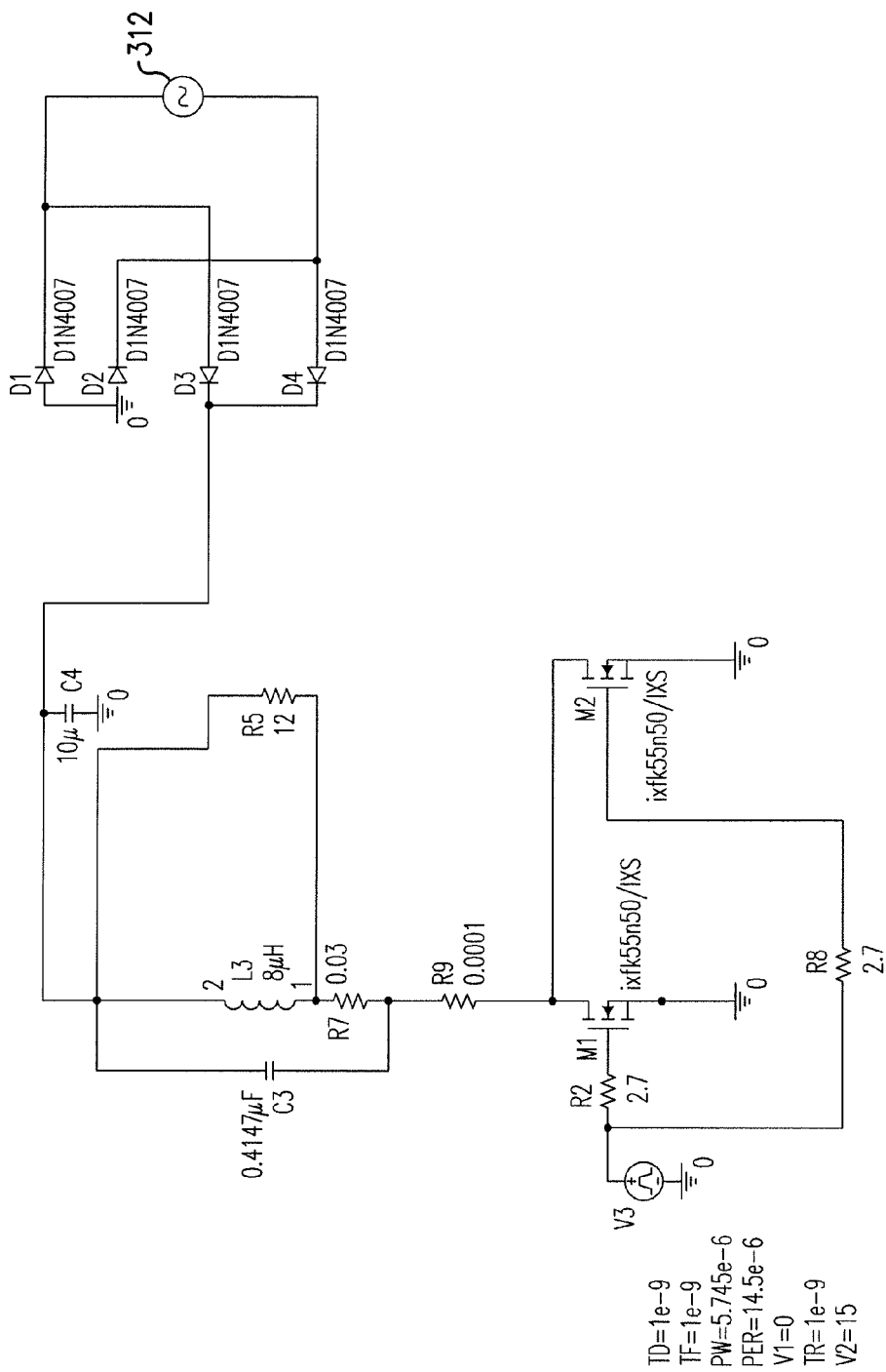
FIG. 5 is a simplified circuit schematic of various components of an appliance according to an embodiment of the invention.

Referring now to FIG. 5, FIG. 5 is a simplified circuit schematic of various components of appliance 100, 400. The circuit shown is a power oscillator design that provides efficient power transfer to container 105. In this embodiment, power switches M1, M2 are driven at just under 70 kHz through R2, R8 with a controlled input waveform V3.

Container 105 is modeled as power resistor R5. Heating element L3 and capacitor C3 provide a resonant circuit. The DC resistance of element L3 is shown as resistor R7.

Diodes D1-D4 comprise the AC line rectifier 310 and provide virtually unfiltered rectified voltage to the RF oscillator. Capacitor C4 provides a low impedance at RF frequencies. Its value is also chosen so that its reactance at line frequency is small providing the circuit with a power factor very close to 1.

Effective heating has been shown to occur at RF frequencies between 45 kHz and 120 kHz but other frequencies may be employed. The resonant heating system can either be self oscillating or driven by an adaptive oscillator providing very efficient operation.

From an RF power transfer stance, operation relies on a known load (container) being placed in the coil. With the employed high coupling efficiency of the coil/container, the circuit Q is very low and in the realm of approximately 2-4. When a part is coupled this tightly, power is transmitted predictably. Stray fields are minimized and generally easy to control. Variations in operating frequency minimally impact power transfer.

Actual power level control is provided by enabling/disabling RF generation at the start of each 50/60 Hz half cycle (AC line zero voltage crossing). Higher power output and therefore increased heating, requires the RF generator to be enabled during a higher number 50/60 Hz cycles. Lower power requires RF to be enabled during fewer cycles. This technique has the added advantage of easier control and beginning each RF envelope at low voltage, minimizing excessive line current spikes and conducted radiation.

Efficient operation occurs because the power switching device (e.g., MOSFET) is operated ZVS (Zero Voltage Switching) in the preferred embodiment, however turning off does not occur at zero current. A modeled waveform is shown in FIG. 6.

Figure 6:
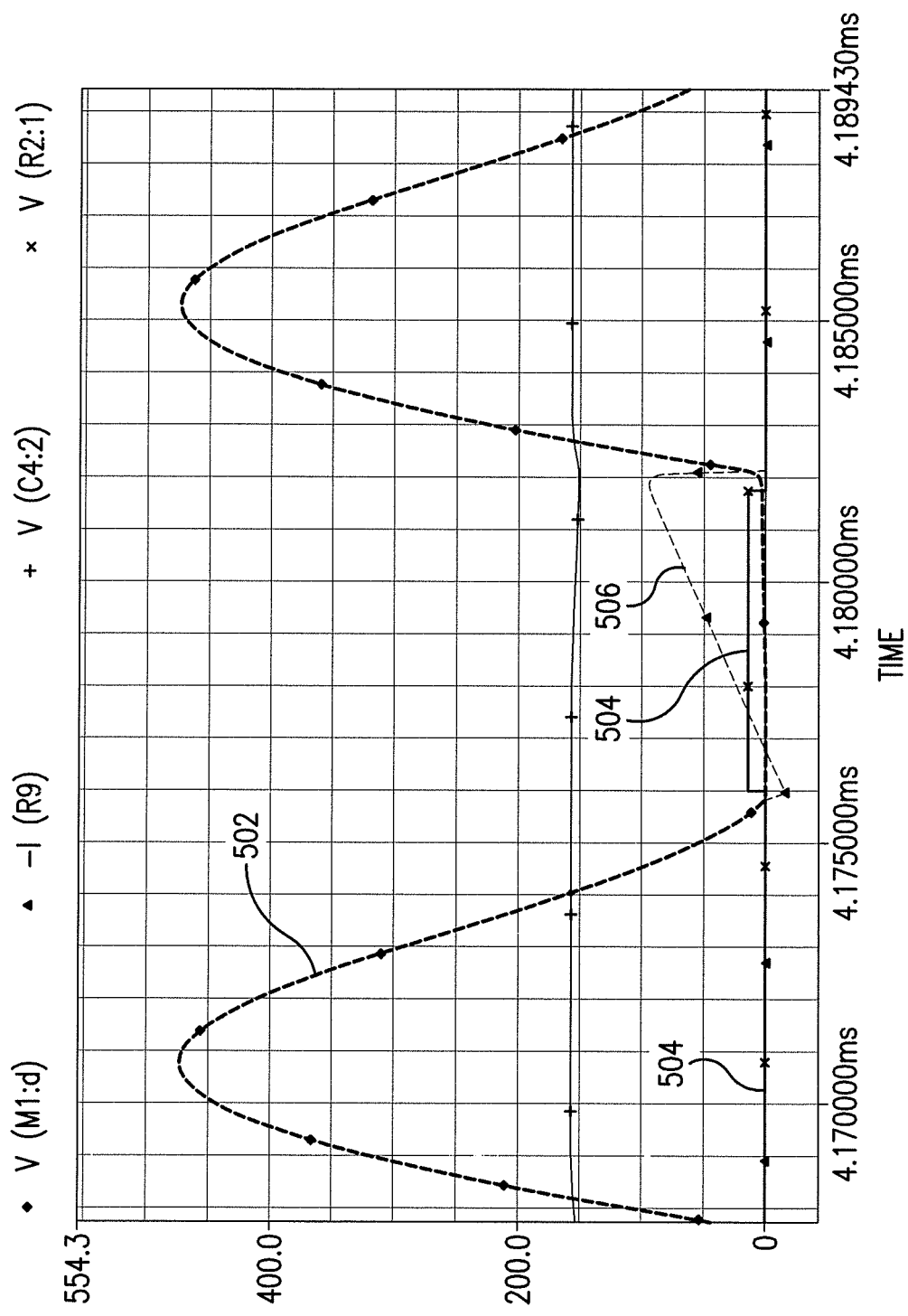
FIG. 6 shows a modeled waveform.

Referring to FIG. 6, notice the MOSFET power switch drain-source Voltage (502) is nearly zero before the gate voltage (504) is applied. Current through the MOSFET is shown (506) and reaches a known (predetermined) peak when the gate voltage is removed. The drain-source voltage may be used as a sensor for this current. During the first interval where the power switch is turned on, the drain current is increasing, so the magnetic field generated by coil L3 is increasing (changing) and imparting energy to the container. In the following interval, the switch is turned off and the coil field collapses—the changing coil field again imparts power to the container. Circuitry is designed to turn on the power switch (MOSFET) as soon as the drain voltage returns to nearly zero, maintaining an efficient method of switching.

Figure 7:
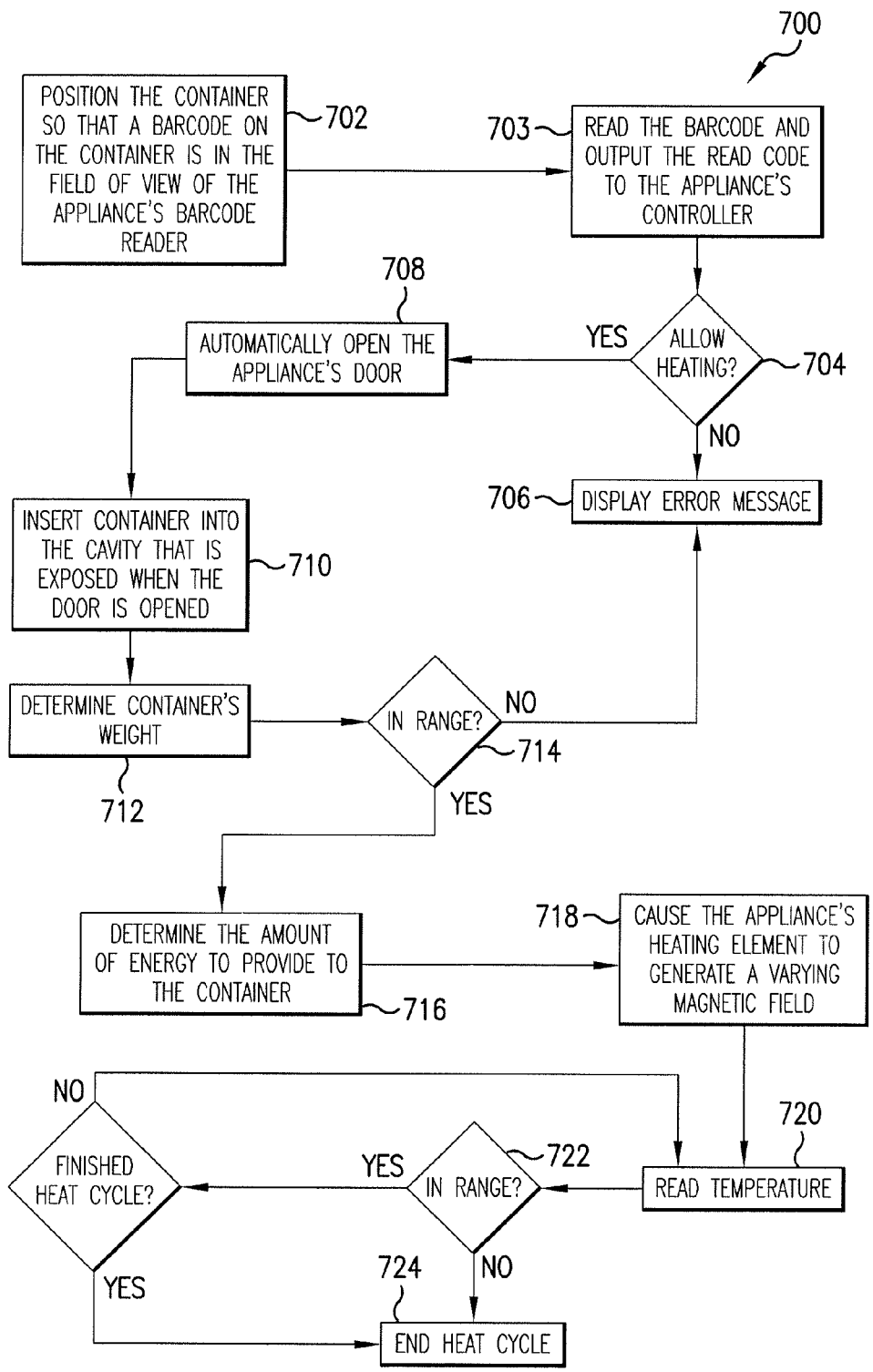
FIG. 7 is a flow chart illustrating a process according to one embodiment.

Referring now to FIG. 7, FIG. 7 is a flow chart illustrating a potential process 700 for heating food stored in a container using an appliance according to one embodiment of the invention.

Process 700 may begin in step 702, where a user of the appliance positions the container so that a barcode on the container is in the field of view of the appliance's barcode reader. In step 702, the reader reads the barcode and outputs the read code (or portion thereof) to the appliance's controller. In step 704, the controller 704 uses the data received from the reader to determine whether or not to allow the user to heat the container. If the controller decides to allow heating, then the process proceeds to step 708, otherwise the controller causes an error message to be displayed on the appliance's display (step 706).

In step 708, controller causes the appliance's door to automatically open, thereby exposing the container receiving cavity. In step 710, the user inserts the container into the cavity. In step 712, after the container is inserted into the cavity, the controller determines the weight of the container. In step 714, controller determines whether the weight falls within a predetermined range (e.g., is the weight over 8 ounces). If not, process 700 may proceed to step 706, otherwise process 700 may proceed to step 716. In step 716, the controller determines the amount of energy to provide to the container. This selection may be based on: user input, data output from reader and/or the determined weight of the container. In step 718, controller operates the appliance's RF power generator, thereby causing the appliances heating element to generate a varying magnetic field, which varying field induces currents in the container, which currents create heat that is transferred to the food in the container. In step 720, while energy is provided to the container, the controller reads the output of a temperature sensor to determine the temperature of the container. In step 722, the controller determines whether the determined temperature is within a predetermined range (e.g., less than X degrees Fahrenheit). If not, the controller causes the appliance to cease providing energy to the container (step 724), otherwise the appliance continues to provide energy to the container until the desired amount of energy has been provided.

After the end of the heat cycle, the door may automatically open so that the user can retrieve the container. After retrieving the container, the user may wish to shake the container because there is a chance the temperature of the food is not uniform and shaking the container improve the likelihood that the temperature will be uniform when the user wants to consume (e.g., drink) the food.

Figure 8:
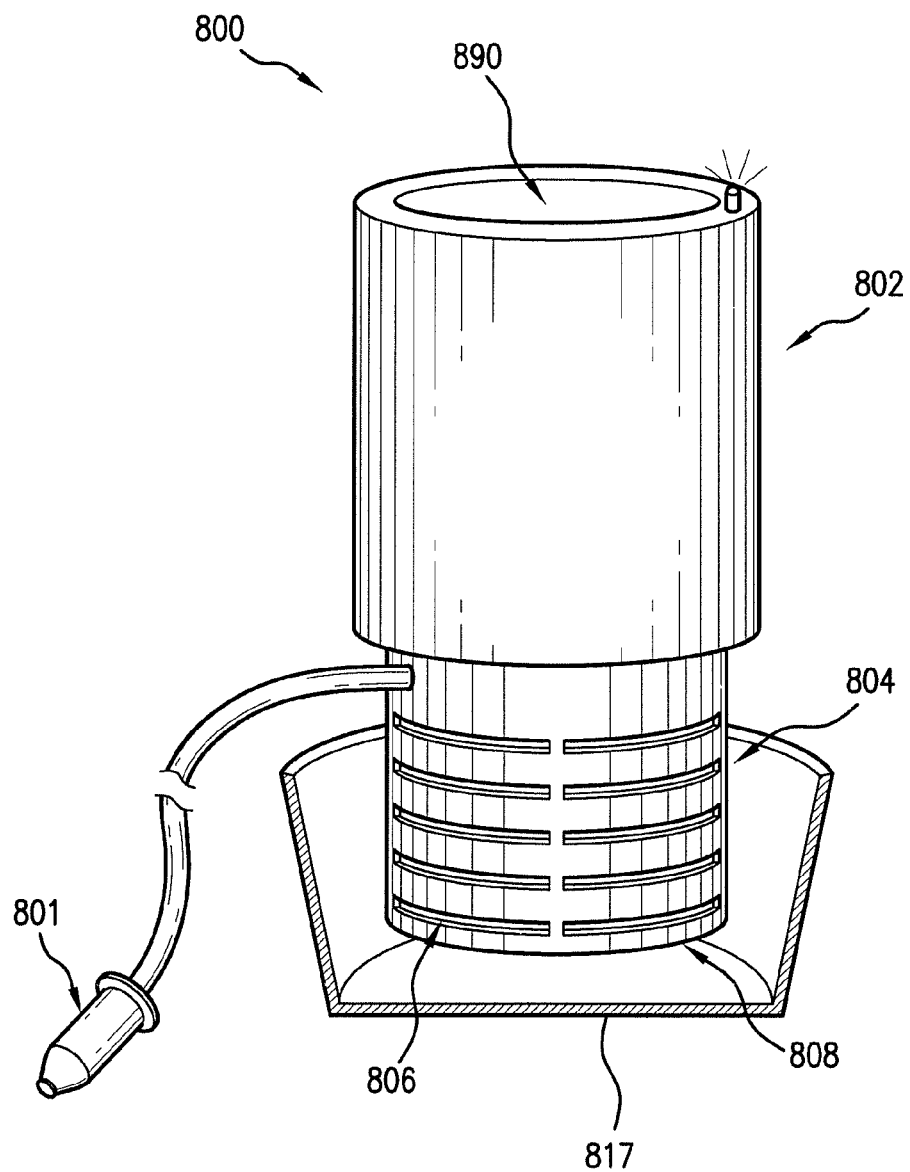
FIG. 8 illustrates an appliance according to a second embodiment of the invention.

Referring now to FIG. 8, FIG. 8 is a schematic illustrating an appliance 800 according to another embodiment of the invention. As illustrated, appliance 800 is in the form of a coffee mug and is portable. That is, appliance 800 includes a generally cylindrical housing 802 that is closed at the bottom and open at the top, thereby forming an opening 890 for receiving food.

Figure 9:
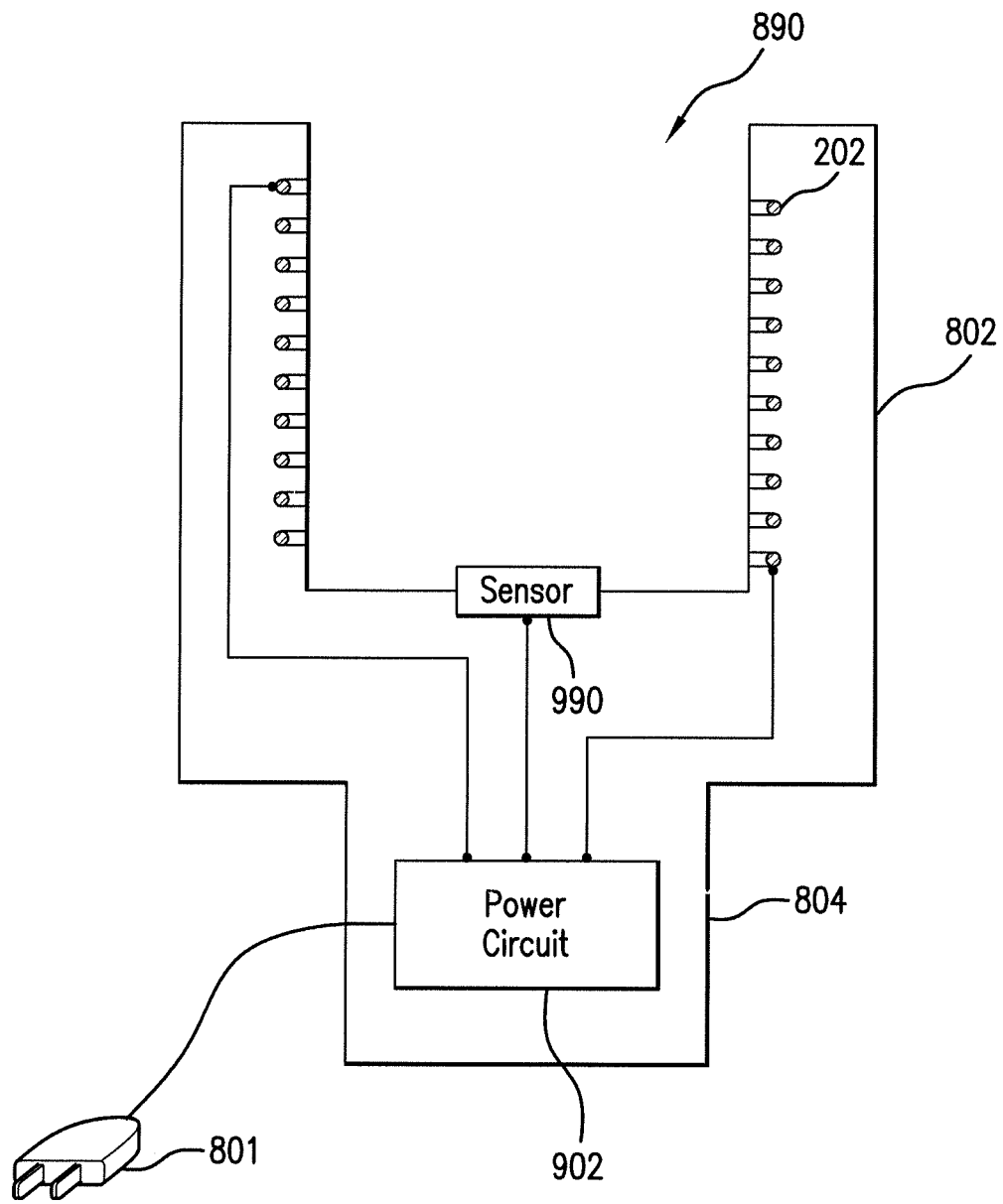
FIG. 9 further illustrates the appliance according to the second embodiment.

Referring now to FIG. 9, FIG. 9 is a cross-sectional illustration of appliance 800. As illustrated in FIG. 9, housing 802 houses RF heating element 202, which is coupled to an RF power circuit 902 that is configured to provide RF power to RF heating element 202. Heating element 202 may be in the form of a coil and the coil may surround a portion of opening 890, as illustrated in FIG. 9. Food (e.g., a beverage) may be placed directly in opening 890 or the food may be enclosed in a can or other container, which is placed in opening 890.

Heating element 202 is used to generate an RF field, which field is used to inductively heat the food placed in opening 890 and/or inductively heat a container placed in opening 890 that contains the food. More specifically, in some embodiments, when RF power circuit 902 provides RF power to element 202 an RF electromagnetic radiation is generated by element 202, which radiation may be used to induce currents in a suitable container (e.g., a magnetic steel container) placed in opening 890. Power circuit 902 may include elements 302, 304, 306, 308 and/or 310, arranged as shown in FIG. 3.

As sown in FIG. 9, in one embodiment, power circuit 902 is housed in a base member 804 of appliance 800. However, in other embodiments, power circuit 902 may be housed in housing 802, while in still other embodiments, some components of circuit 902 are housed in housing 802 while the remaining components are housed in base 804. In some embodiments, power circuit 902 is designed to receive its power from, for example, a power source in a vehicle (e.g., a battery). Thus, appliance 800 may include a plug 801 (see FIG. 8) for receiving power from a power source in a car. For example, plug 801 may mate with an automotive power socket (e.g., cigarette lighter socket).

Referring back to FIG. 8, housing 802, in one embodiment, sits atop cylindrical base member 804. Housing 802 and cylindrical base member 804 may be separate pieces that have been attached together or they may be integral (e.g., formed from a single piece or mold). In some embodiments, base member 804 has an outer diameter that is less than the outer diameter of housing 802, thereby enabling base member 804 to fit into a cup-holder 817. Base member 804 may be tapered to facilitate insertion into cup-holder 817. As also shown, base member may include air vents 806 for cooling circuitry (e.g., generator 302) that may be housed in base member 804 and/or housing 802. Additionally, an end 808 of base member 804 (e.g., the end that is inserted into cup-holder 817) may be weighted to prevent appliance 800 from tipping over when it is in an upright position.

A person who spends a large amount of time in a vehicle may find appliance 800 quite useful as it enables the person to heat foods while the person is in the vehicle. Preferably, to facilitate consumer acceptance, appliance should be simple to use. Accordingly, in some embodiments, appliance has only a minimal number of buttons or no buttons at all. For example, in some embodiments, appliance 800 includes a sensor 990 (see FIG. 9) for determining that food has been placed in the opening 890 and, in response to sensor 990 detecting this event, appliance 800 automatically begins providing RF power to element 202 to, thereby, heat the food.

In some embodiments, appliance may have a heat mode and a keep warm mode (in this embodiment hosing 802 may have two buttons thereon—one to activate the heat mode and the other to activate the keep warm mode—or a switch to switch between the two modes—or other user interface element to enable the user to select the desired mode). In the heat mode, a greater amount of power is provided to the coil than in the keep warm mode. Thus, if a person already has hot food, the person can put the food into opening 890 and select the keep warm mode to keep the food warm and conserve power.

Appliance 800 may include any or all of the safety features (e.g., sensors 314 and 317 and reader 316) described above with reference to appliance 100.

While various embodiments/variations of the present invention have been described above, it should be understood that they have been presented by way of example only, and not limitation. Thus, the breadth and scope of the present invention should not be limited by any of the above-described exemplary embodiments.

Additionally, while the process described above and illustrated in the drawing is shown as a sequence of steps, this was done solely for the sake of illustration. Accordingly, it is contemplated that some steps may be added, some steps may be omitted, and the order of the steps may be re-arranged.

What is claimed is:

1. A portable food heater, comprising:

a generally cylindrical housing having an opening formed in a top portion of the housing for receiving food;

a radio-frequency (RF) heating element housed in the housing and at least partially surrounding the opening;

a generally cylindrical base member connected to or integral with a bottom portion of said housing, said base member being configured to fit into a conventional automobile cup holder;

an RF power circuit configured to provide RF power to the RF heating element, said RF power circuit being housed in said housing and/or said base member; and a power plug electrically coupled to the RF power circuit, said power plug being configured to mate with an automotive power socket.

2. The portable food heater of claim 1, wherein the RF power circuit that is housed in said housing and/or said base member comprises:

an oscillator for generating an RF signal; and a power amplifier for receiving and amplifying the RF signal, wherein the RF heating element is coupled to an output of the power amplifier.

3. The portable food heater of claim 1, wherein the base member has an outer diameter that is less than an outer diameter of the housing.

4. The portable food heater of claim 1, wherein at least a portion of the RF power circuit is housed in the base member, and the base member includes air vents for cooling said at least a portion of the RF power circuit housed in the base member.

5. The portable food heater of claim 1, wherein the portable food heater is operable to operate in a heating mode, and the portable food heater is also operable to operate in a warming mode, wherein when the portable food heater is operating in the heating mode, the RF power circuit is configured to provide a first amount of power to the RF heating element, when the portable food heater is operating in the warming mode, the RF power circuit is configured to provide a second amount of power to the RF heating element, and the second amount of power is less than the first amount of power.

6. The portable food heater of claim 5, wherein the portable food header has a means for enabling a user to select between the heating mode or the warming mode.

* * * * *